May 21, 1968  F. P. BRILANDO ET AL  3,383,940
BICYCLE STICK SHIFT MECHANISM
Filed March 9, 1966
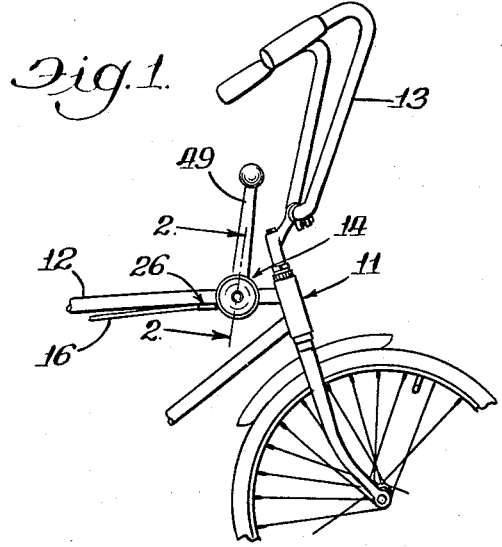
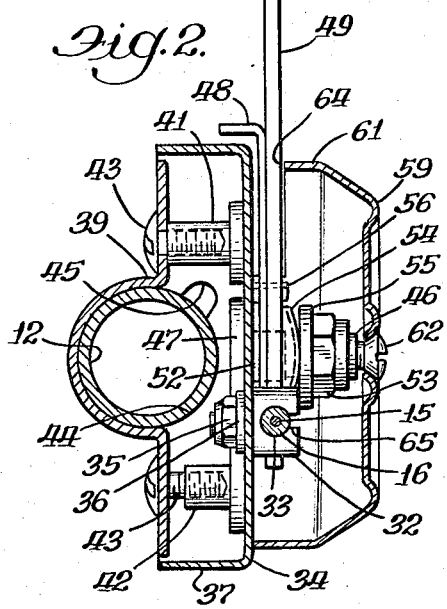
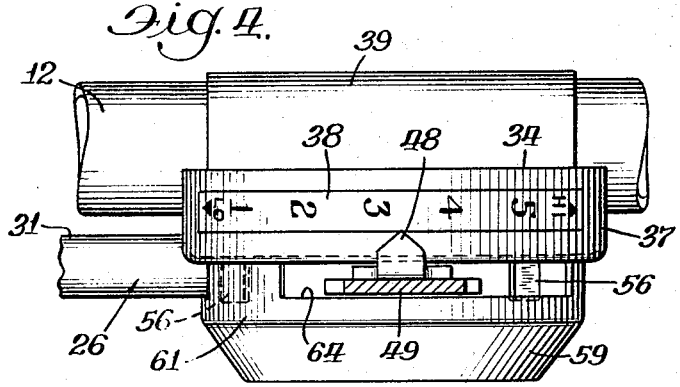
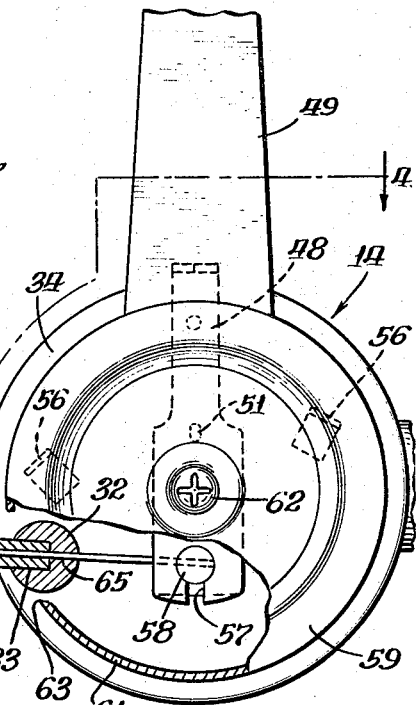
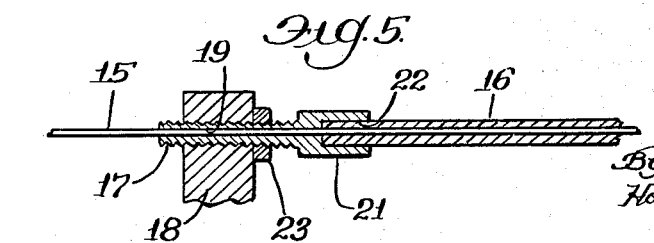
Inventors:
Frank P. Brilando
Stanley R. Jameson
By:
Horton, Davis, Brewer & Brugman
Attys.

_United States Patent Office_

3,383,940
Patented May 21, 1968

3,383,940
BICYCLE STICK SHIFT MECHANISM
Frank P. Brilando, Niles, and Stanley R. Jameson, Chicago, Ill., assignors to Schwinn Bicycle Company, a corporation of Illinois
Filed Mar. 9, 1966, Ser. No. 532,996
10 Claims. (Cl. 74—501)

This invention relates in general to bicycle gear shifting mechanism, and more particularly to improvements in manually operable means for actuating the well-known derailleur type of mechanism for disengaging the drive chain of a bicycle from one driven sprocket and engaging it with another to selectively change the driving ratio between the pedal-driven sprocket and the rear wheel.

In such mechanisms it is customary to include a relatively heavy spring for urging derailleur or chain-guiding discs laterally of the sprockets in one direction and to use a cable for moving the discs oppositely against the action of such spring, but because the disengagement and re-engagement of the chain with the driven sprockets must be timed with the movements of the latter, breakage and damage to the cable and other parts frequently results from inexpert manual operation of the cable. Further, if it is desired to facilitate such operation by employing a cable-operating lever having a relatively long lever arm, the chances of such damage are greatly increased.

A principal object of this invention, therefore, is to avoid such damage and render operation of the derailleur mechanism substantially foolproof. This is accomplished by providing a stick shift mechanism for operating the derailleur or gear ratio control that includes a novel spring overload device interposed between the latter and a manually operable member which enables delayed action of the derailleur control device in response to operation of the manual member.

More specifically, the invention contemplates interposing a spring overload device between the movable end of a tubular flexible casing which houses the cable and guides the same for longitudinal movements in an arcuate path, the other end of which casing is fixed at a first point, and a second fixed point to permit changes in the curvature of the arcuate path due to forces longitudinally applied to one end of the cable while its other end is restrained against movement. This overload device thereafter will function to enable automatic return of the casing and cable to their normal curved condition and positions relative to each other as the control device completes its delayed action.

In more general applications, the invention contemplates interposing such a spring overload device between the movable end of the casing for a manually operable cable and a fixed point, where the other end of the casing is fixed, the casing and cable normally define an arc, and the cable is operatively connected to any desired control device.

Another object of the invention is to improve the operation of such an overload device, prevent wear on the cable, and facilitate the connection of the cable to its manually operable member, which is accomplished by providing means defining the fixed point engaged by the overload device which is pivoted on an axis perpendicular to the longitudinal axis of the overload device.

A further object of the invention is to render it particularly applicable to a bicycle, and this is effected by providing a rigid case for supporting the manually operable member and the fixed point means which cooperates with the overload device, and clamping means for adjustably mounting the case on the frame of the bicycle at any point convenient for operation by a rider.

Numerous other objects and advantages of our invention will be apparent as it is better understood from the following description, which, when taken in connection with the accompanying drawings, discloses a preferred embodiment thereof.

In the drawings:

FIG. 1 is a side elevation of a portion of a bicycle showing a stick shift and overload mechanism embodying the features of this invention mounted thereon;

FIG. 2 is a transverse sectional view taken substantially on the line 2—2 of FIG. 1;

FIG. 3 is a side elevational view similar to FIG. 1 on a larger scale and showing the overload mechanism in vertical longitudinal section;

FIG. 4 is a top plan view, with the manually operable member in section, as seen from the line 4—4 of FIG. 3; and FIG. 5 is a detail vertical section illustrating the attachment of the rear or lower end of the cable casing.

Referring more particularly to FIG. 1, reference numeral 11 indicates in general a bicycle which includes a frame 12 and handle bars 13. This figure illustrates one convenient location for attachment to the frame 12 of stick shift mechanism embodying the features of this invention and indicated generally by reference numeral 14. This mechanism is adapted to operate a control device, such as a well-known derailleur type of mechanism for disengaging the drive chain of the bicycle from one driven sprocket and engaging it with another to selectively change the driving ratio between the pedal-driven sprocket and the rear wheel. To this end, the stick shift or manually operable mechanism is connected in a manner to be described hereinafter in greater detail to one end of a cable 15 (FIG. 3), the other or rear end of which is connected in well-known manner to the control device which it is intended to operate. A major portion of the cable 15 is housed protectively within and guided by a flexible tubular casing 16. This casing 16 normally is disposed adjacent one of the longitudinal members of the bicycle frame 12 to define an arcuate path for longitudinal movements of the cable 15.

As best seen in FIG. 5, the rear or lower end of the casing 16, or the end thereof remote from the stick shift mechanism 14, is anchored relative to the frame at a first fixed point by means of a threaded bushing 17 extending through a suitable tapped aperture in a stationary portion 18 of the frame 12 or a part of the derailleur mechanism. This bushing 17 has a bore 19 for slidably accommodating the cable 15 and terminates in a head portion 21 having an enlarged bore 22 for receiving and engaging the lower end of the tubular casing 16 and preventing movement thereof relative to the bicycle frame. The threaded portion of the bushing 17 permits of limited adjustment thereof relative to the mounting portion 18, and a suitable nut 23 is provided for retaining the bushing in adjusted position.

The other or forward end of the tubular casing 16 is received within a longitudinal bushing 24 (FIG. 3) slidably disposed within the outer end of a tubular housing 25 and forming part of a spring overload means indicated generally by reference numeral 26. The inner end of the bushing 24 is enlarged to function as a piston in the tubular housing 25, and the latter is provided with an inwardly extending end flange 27 for limiting outward movement of the bushing 24 relative thereto. A second bushing 28 is mounted in the other end of the tubular housing 24 with a similar enlarged head portion disposed interiorly of the latter for movement-limiting cooperation with an end flange 29 formed on the housing. Each of the bushings 24 and 28 is provided with a longitudinally extending bore for slidably accommodating the cable 15. Also forming a part of the overload means 26 is a coil spring 31 disposed within the housing 25 and interposed between the bushings 24 and 28.

The outer end of the second or forward bushing 28 of this spring overload means 26 is received and frictionally retained by a stud 32 having an enlarged head portion provided with a laterally extending recess 33 for receiving the outer end of the bushing 28. This stud 32 defines a second fixed point, and it is between this point and the forward end of the casing 16 that the spring overload means 26 thus is interposed. Since the operation of this mechanism contemplates changes in the curvature of the arcuate path defined by the tubular casing 16, the stud 32 preferably is mounted for pivotal movement on an axis perpendicular to the longitudinal axis of the overload means 26, thus enabling swinging of the latter to accommodate such movements of the casing 16.

To this end, the stud 32 is reduced in diameter beyond its head and extends through a suitable aperture in the main body of a case member 34 (FIG. 2) forming a part of the stick shift mechanism 14. This reduced portion of the stud 32 is threaded to receive an elastic or jam nut 35 which, with a suitable washer 36 interposed between it and the case member 34, securely retains the stud 32 on the latter while permitting rotation thereof on its longitudinal axis. The case member 34 terminates in a peripheral flange 37 on the upper outer surface of which may be mounted a suitable indicia-bearing member or decal 38 for a purpose later to be described.

Means are provided for adjustably mounting the stick shift mechanism 14 on the bicycle frame 12 and preferably conveniently near the handle bars 13 which comprises a clamping plate 39 (FIG. 2) having its central portion formed to accommodate and receive a longitudinally extending part of the frame 12 and dimensioned exteriorly to substantially enclose and lie within the peripheral flange 37 of the case member 34. The latter is provided with a plurality of spacer nuts 41 and 42 having their head portions secured thereto, as by welding, and adapted to receive screws 43 extending through suitable apertures in the clamping plate 39. There are two such spacer nuts 41 on the upper portion of the case 34 and one such nut 42 on the lower portion thereof. As seen in FIG. 2, the peripheral flange 37 of the case 34 is cut away to provide recesses 44 for engagement with a bar of the bicycle frame 12, and the lower spacer nut 42 is considerably shorter than the upper spacer nut 41, so that tightening of the screws 43 will cause the plate 39 and case member 34 to clampingly engage the bicycle frame and rigidly maintain the stick shift mechanism 14 in desired adjusted position thereon. Incidentally, it will be noted from FIG. 2 that the peripheral flange 37 also may be provided with suitable notches 45 for accommodating brake cables or the like and permitting the same to extend longitudinally along the upper member of the frame 12 in well-known manner.

Extending through a suitable central aperture in the case member 34 is a stud shaft 46 having an enlarged head 47 which is secured to the inner surface of the case 34 in any suitable manner. This stud shaft 46 rotatably accommodates and supports the lower end of a pointer 48 and a lever 49, with these two members being provided with suitable inter-engaging means 51 (FIG. 3) for insuring simultaneous pivotal movements thereof on the shaft. A fibre spacer washer 52 (FIG. 2) is interposed between the pointer 48 and the outer surface of the case member 34, and the outer end of the stud shaft 46 is externally threaded to receive a locking nut 53. A friction or spring washer 54 and a spacer 55 are interposed between the nut 53 and the lever 49 to provide adjustable limited resistance to manually operated pivotal movements of the lever 49. The case member 34 also preferably is provided with a pair of stops 56 for limiting such pivotal movements of the lever 49, and these stops may be formed by being struck outwardly from the body of the case 34.

The lower end of the lever 49 is provided with a keyhole slot 57 for receiving an anchoring or terminal stud 58 secured in any suitable manner to the upper end of the cable 15. A cover member 59 may be provided to enclose the lever 49 and the stud 32 which is formed with a peripheral flange 61 adapted to be held against the outer face of the case 34 by a retaining screw 62 extending through a suitable central aperture in the cover and cooperating with a tapped aperture in the end of the stud shaft 46. As shown in FIG. 3, the peripheral flange 61 of the cover 59 is provided with a notch 63 to accommodate the forward end of the spring overload means 26, while it is slotted or cut away at 64 in its upper portion to provide clearance for the manually operable lever 49 and the pointer 48 (FIGS. 2 and 4). It will be noted from the latter figures that the upper end of the pointer 48 cooperates with the indicia on the member 38 to indicate the various selectable positions to which the lever may be moved.

It will be apparent from the foregoing description that pivotal movement of the manually operable stick shift lever 49 about its mounting shaft 46 normally will be transmitted to the cable 15 to effect selected operation of the control device to which the other end of the cable (the left end in FIG. 5) is attached. It also will be appreciated that in most any installation the tubular casing 16 will guide the cable 15 for such longitudinal movements in an arcuate path, one of the advantages of any such flexible cable connection being that it is capable of transmitting forces between spaced points on other than a straight line between those points. Further, it will be apparent that if there is no interference with such movements of the cable by the lever 49, there will be no necessity for the spring overload means 26.

However, in many installations, such as that previously referred to for operating the well-known derailleur type of mechanism on a bicycle, immediately responsive movement of the far end of the cable 15, which is attached to the device to be controlled, may be prevented or delayed for one reason or another. In the specific embodiment herein illustrated for use on bicycles, such prevention or delay of movement of the lower end of the cable 15 may be due to the attempted movement thereof not coinciding with the movements of the drive chain and the driven sprockets.

Whatever the cause, the spring overload means herein described will effectively prevent any resulting damage by permitting such movement of the manually operable lever 49 to be effected without moving the further or lower end of the cable. This is accomplished because such movements of the lever 49, with the far end of the cable 15 prevented from movement, will cause a change in the curvature of the arcuate path defined by the tubular casing 16, and this is permitted by the spring overload device 26 being interposed between the movable end of the casing 16 and the second fixed point defined by the stud 32. For example, if the upper portion of the lever 49 is moved rearwardly (to the left in FIG. 3), its lower end will move the cable 15 forwardly or to the right in that figure. If the left or lower end of the cable 15 at that time is prevented from movement, this will tend to straighten out the cable and its protective and guiding casing 16. Such straightening of the casing 16 would not be permitted if its upper end also were fixed, as is its lower end, but it is permitted by the interposed spring overload means 26, merely resulting in movement of the bushing 24 into the housing 25 against the action of the spring 31.

It also will be appreciated that if the manually operable lever 49 then is retained in the position to which it has been moved, release of the holding forces at the lower or opposite end of the cable 15 will permit the spring 31 to return the bushing 24 outwardly toward its position of FIG. 3, and that this will result in return of the tubular casing 16 to its normal position or curvature causing, in this instance, corresponding movement of the major portion of the cable 15 and resulting movement of its lower end and the control device attached thereto to the same degree as would have been effected had it not previously been prevented.

It will now better be appreciated why the stud 32 which defines the second fixed point referred to is mounted for pivotal movement as described. With this arrangement and the engagement of the second bushing 28 in the recess 33 in the head of the stud 32, swinging of the overload device 26 and its housing 25 up or down about the pivotal axis of the stud 32 will be permitted, and this will materially facilitate the changes in the curvature of the arc defined by the housing 16 due to the prevention of movement of the lower end of the cable 15 while the upper end thereof is being moved. Pivotal movement of the stud 32 also eliminates wear on the cable 15 during its longitudinal movements, since the cable extends through a guide slot 65 in the stud 32 which communicates with the recess 33, the end of cable 15 attached to lever 49 being moved by the latter in an arcuate path.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In combination with a cable for actuating a control device at a first end thereof, and a manually operable member connected to the second end of said cable for applying forces longitudinally thereto, a tubular flexible casing slidably enclosing a major portion of said cable and guiding the same for longitudinal movements in an arcuate path, means for anchoring a first end of said casing and defining a first fixed point, and overload means interposed between the second end of said tubular casing and a second fixed point for guiding movements of said casing in response to changes in the curvature of said arcuate path due to the application of forces to said second end of the cable when said first end thereof is held stationary.

2. The combination of claim 1, wherein said overload means comprises a tubular housing through which said cable extends, a bushing engaging said second end of said casing and slidable in said housing, and spring means disposed within said housing for cooperation with said bushing.

3. The combination of claim 2, wherein said overload means includes a second bushing for guiding said cable and having an inner end disposed in said housing for cooperation with said spring and an outer end engageable with means comprising said second fixed point.

4. The combination of claim 3, wherein said second fixed point means is pivoted on an axis perpendicular to the longitudinal axis of said tubular housing.

5. The combination of claim 4, wherein said manually operable member comprises a lever pivotally mounted on an axis parallel to the axis of said second fixed point means.

6. In the combination of claim 5 adapted for use on a bicycle having a frame, a rigid case for supporting said second fixed point means and said lever, and clamping means for adjustably mounting said case on said frame.

7. In the combination of claim 6, stop means for limiting pivotal movements of said lever.

8. In the combination of claim 6, a cover attachable to said case to enclose the pivotal mounting of said lever and said second fixed point means and having an aperture providing access to the latter for said overload means.

9. In the combination of claim 1 adapted for use on a bicycle having a frame, means for securing said first fixed point anchoring means to said frame, and means for adjustably mounting said manually operable member on said frame for convenient operation and to establish said second fixed point.

10. The combination of claim 9, wherein said manually operable member comprises a lever pivotally mounted intermediate its ends, and means for releasably attaching one end of said lever to said second end of said cable.

No references cited.

FRED C. MATTERN, JR., *Primary Examiner.*

F. D. SHOEMAKER, *Assistant Examiner.*